Feb. 28, 1928.
H. E. ANDERSON
1,660,700
BRAKE APPARATUS FOR RAILWAY AND OTHER VEHICLES
Filed Oct. 1, 1921    4 Sheets-Sheet 1
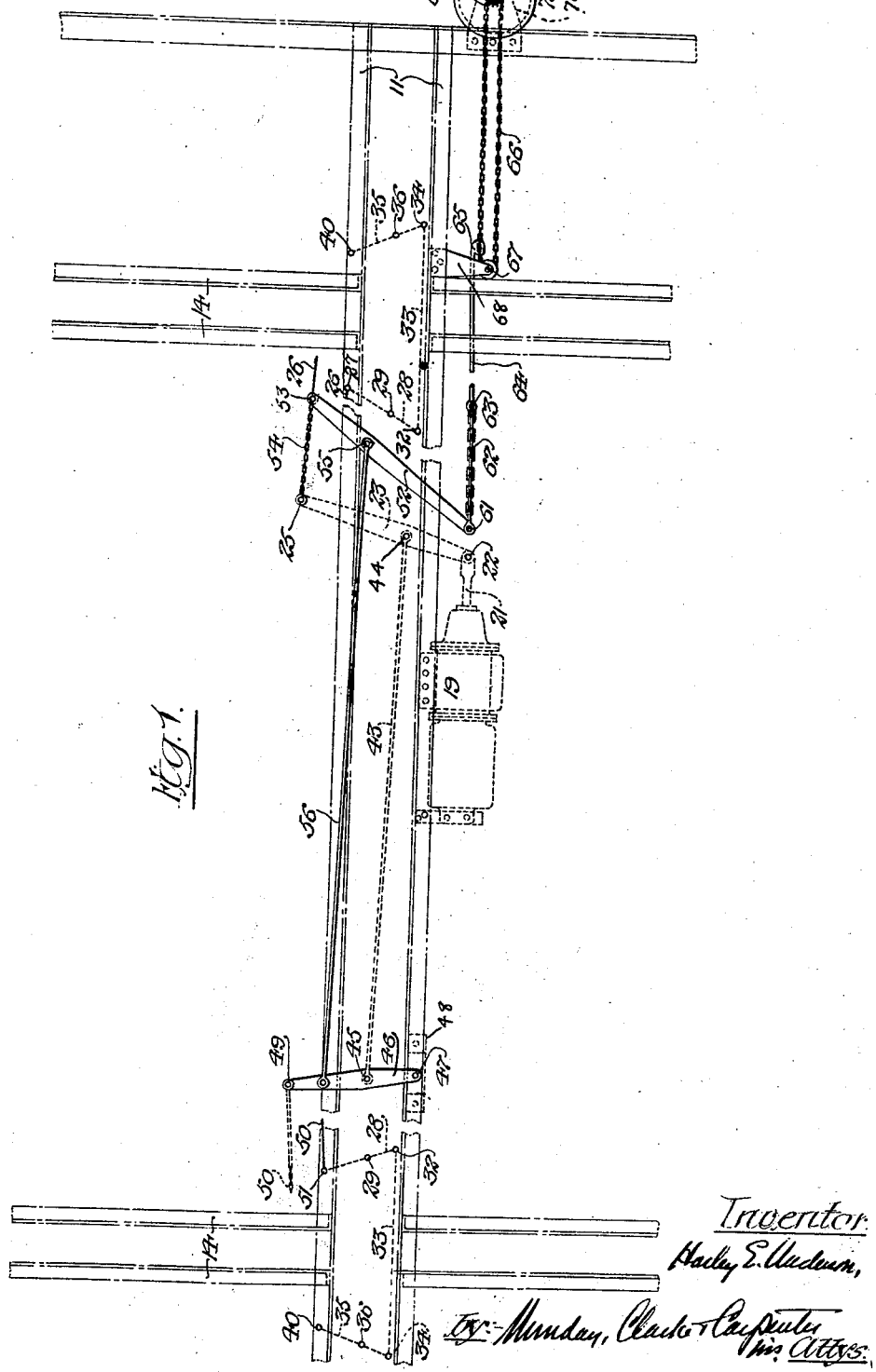

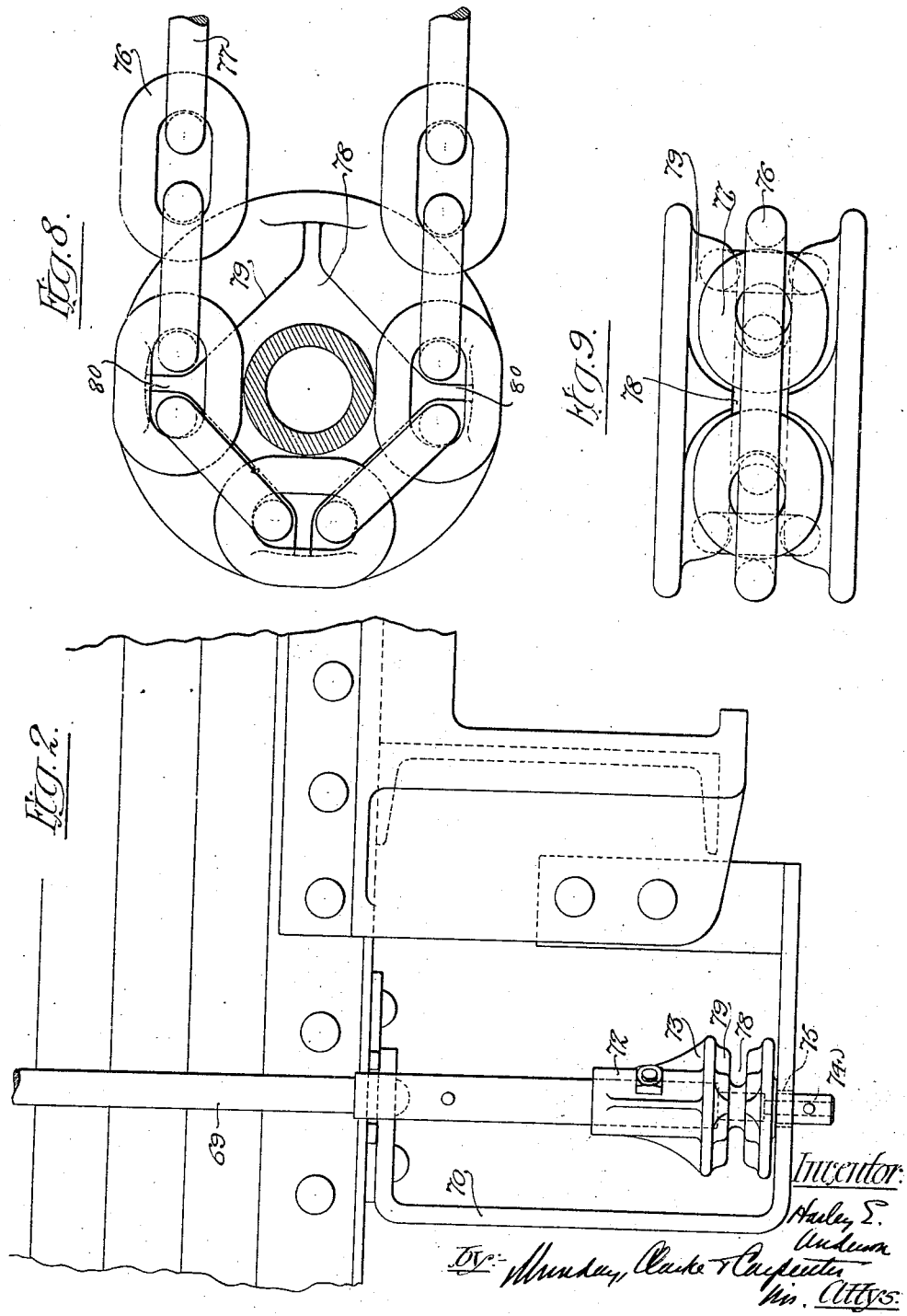

Feb. 28, 1928.
H. E. ANDERSON
1,660,700
BRAKE APPARATUS FOR RAILWAY AND OTHER VEHICLES
Filed Oct. 1, 1921    4 Sheets-Sheet 3
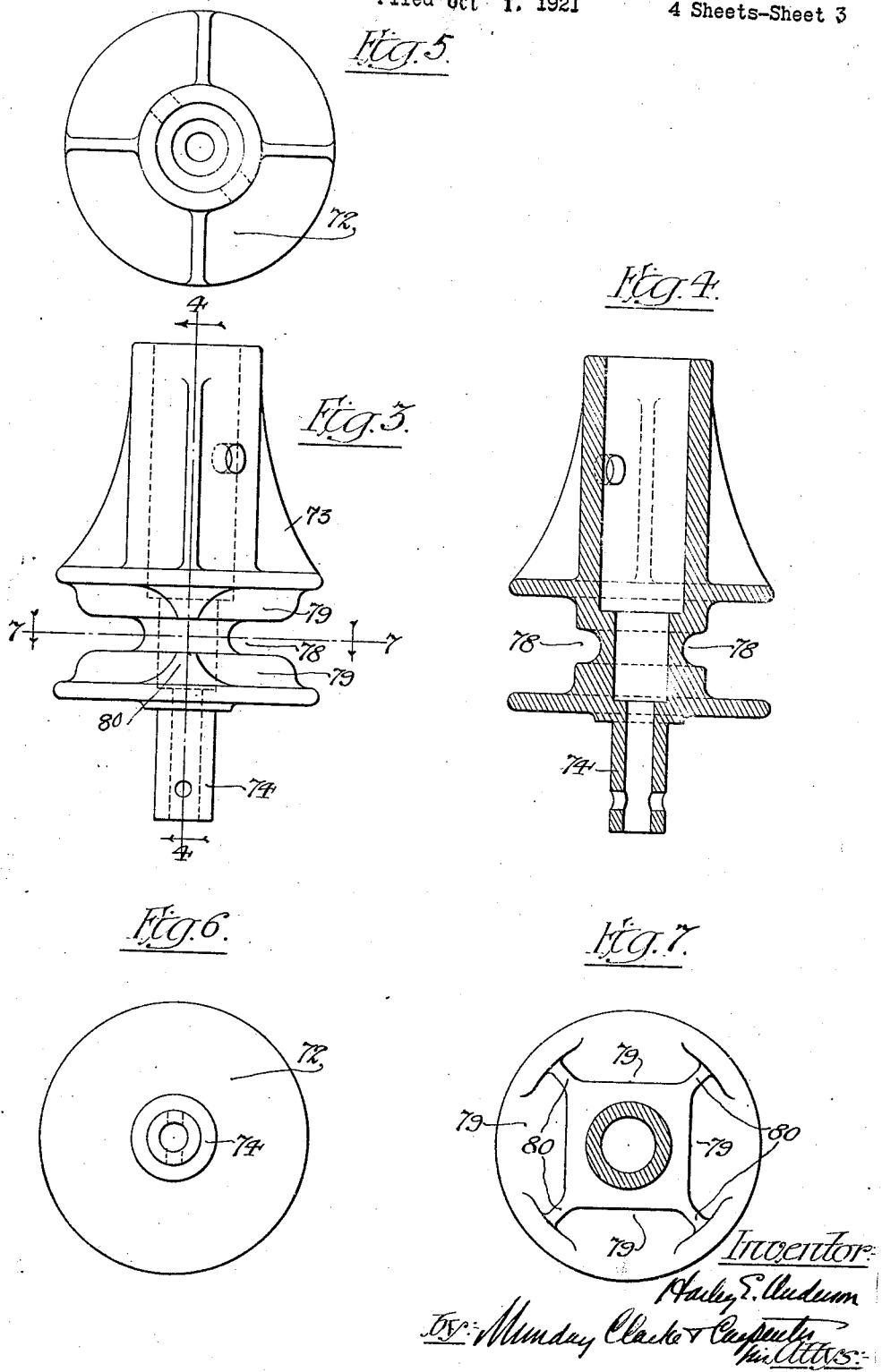

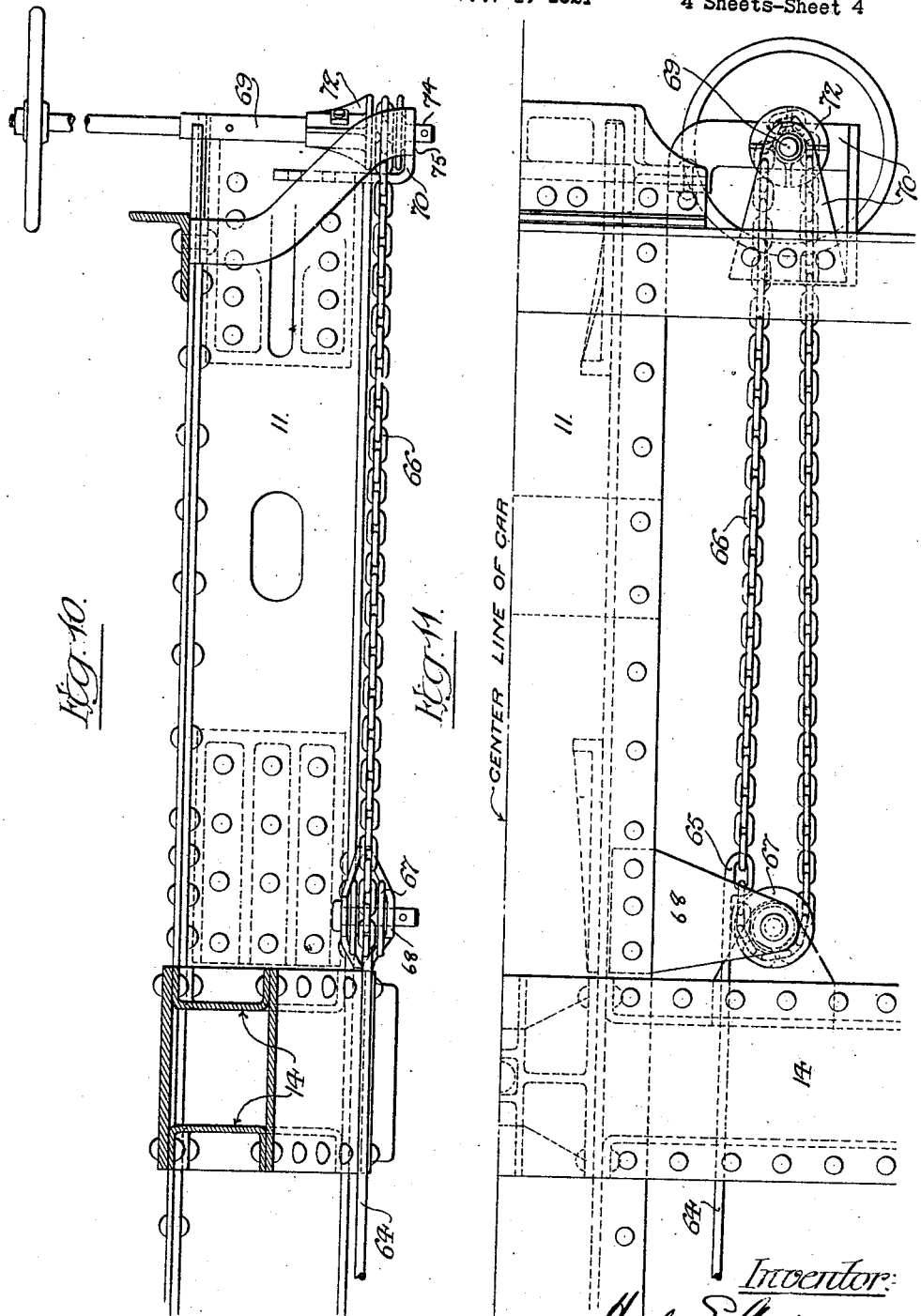

Patented Feb. 28, 1928.

1,660,700

UNITED STATES PATENT OFFICE.

HARLEY E. ANDERSON, OF CHICAGO, ILLINOIS, ASSIGNOR TO THE ANDERSON BRAKE APPLIANCE COMPANY, OF CHICAGO, ILLINOIS, A CORPORATION OF ILLINOIS.

BRAKE APPARATUS FOR RAILWAY AND OTHER VEHICLES.

Application filed October 1, 1921. Serial No. 504,648.

This invention relates to brake apparatus, that is especially adapted for railway vehicles, and has for objects to provide a simplified hand operated railway brake apparatus which operates in harmony with the air brake equipment, and which, under normal and even subnormal operating conditions will develop braking power not less and even greater than that developed by the airbrake equipment, with the result that railway and other vehicles equipped with brake apparatus constructed in accordance with the invention are provided with reserve braking power that is amply sufficient in extreme emergencies and entirely adequate in case of a total failure of the air brakes. The invention is further characterized by the provision of an improved connecting means interposed between the brake levers and the hand brake staff, which eliminates the necessity for wrapping a chain around the brake staff, as commonly employed and insures adequate movement of the staff to develop the high braking power provided by the lever arrangement of the invention, without any danger whatever of jamming or in any way retarding the operation of the hand brake staff.

In addition to the general objects recited above, the invention has for further objects such other improvements or advantages in construction and operation as are found to obtain in the structures and devices hereinafter described or claimed.

In the accompanying drawings, forming a part of this specification and showing, for purposes of exemplification, a preferred form and manner in which the invention may be embodied and practiced, but without limiting the claimed invention specifically to such illustrative instance or instances:

Figure 1 represents a diagrammatic plan view of a United States standard steel frame railway box car equipped with railway brake apparatus constructed in accordance with the present invention;

Fig. 2 is a detailed elevational view of the lower portion of the brake staff showing a part of the improved connection means of the invention;

Figs. 3 and 4 are respectively side elevational and vertical sectional views of the sheave supported at the lower end of the brake staff;

Figs. 5 and 6 are respectively top and bottom plan views of said sheave;

Fig. 7 is a horizontal section of the same taken on the line 7—7 of Fig. 3;

Fig. 8 is an enlarged horizontal section of the sheave showing the mode of engagement of the connecting endless chain member therewith;

Fig. 9 is an end elevational view of the parts illustrated in Fig. 8;

Fig. 10 is an enlarged side elevation of the connection means of the invention; and Fig. 11 is a plan view of the same.

The same characters of reference designate the same parts in each of the several views of the drawings.

In its present embodiment, the invention is applied to a United States standard steel frame railway box car in conjunction with standard parts of air brake equipment and with other parts of standard type. For convenience the present description will be confined to the present illustrative embodiment of the invention. The invention, however, is obviously capable of other valuable applications, for example, to other railway rolling stock; hence the scope of the invention is not confined to the specific use and specific embodiment herein described as an illustrative embodiment.

The accompanying drawings illustrate, by way of example, views of a United States standard steel frame railway box car, the frame of which is constituted of the usual center sills 11, said sills being braced by the body bolsters 14 that extend transversely of the car and are secured against the sides of the center sills. The car is supported at its opposite ends upon the usual truck assemblies which include the car wheels.

The air brake equipment illustrated in the drawings includes parts of standard type, and embodies in its construction an air brake cylinder and reservoir 19 secured to the underframe of the car. The push rod 21 of the air brake cylinder 19 is pivoted at 22 to the cylinder lever 23, the latter being, in the present instance, a floating lever supported by the car under frame. At its extreme end from the pivotal point 22, the cylinder lever 23 is pivotally connected at 25 to the inner end of the top connection 26 which extends to the truck at one end of the car. At its truck end, the said top connection 26 is pivotally connected at 27 to one end of the brake shoe or live truck lever 28. The latter is pivoted between its ends at 29 to the usual brake beam of one pair of wheels, and is also pivoted at its end 32 opposite to the pivotal connection 27, to a connecting link 33. The other end of this connecting link 33 is pivoted at 34 to one end of the brake shoe or dead truck lever 35, said brake shoe or dead truck lever being pivoted between its ends at 36 in a yoke of the brake beam of the other pair of beams. The end of the dead truck lever 35 opposite to the pivot point 34 is fulcrumed, as shown at 40. The brake beams actuate pairs of brake shoes in the usual manner to apply braking power to the truck wheels during operation of the air brake equipment. When air enters the cylinder 19, the push rod 21 is pushed out of the cylinder, and such movement of the push rod 21 is accompanied by a movement of the cylinder lever 23 which pulls the top connection 26 toward the transverse center of the car, thereby pulling the live brake shoe lever 28 which in turn pushes the bottom connection 33 and the dead brake shoe lever 35 to set the brakes against the wheels. Braking power is applied concurrently to the wheels of the truck at the other end of the car and with the same outward movement of the push rod 21. For this purpose, the center connection 43 has one end pivoted at 44 under and between the ends of the cylinder lever 23, and the other end pivoted at 45 to and between the ends of a transmitting lever 46 that is fulcrumed at 47 on a bracket 48 supported by the car under frame.

According to the present embodiment of the invention, the fulcrum point 47 of the transmitting lever 46 is reversed with respect to that employed in standard practice. The free end of the lever 46 is pivoted at 49 to the inner end of the other top connection 50, and the latter extends to and is pivoted at 51 to the live lever 28 of the brake parts of one of the trucks. As the rod 21 is pushed out of the cylinder by the air, the cylinder lever 23 pulls on the rod 43, which in turn pulls the lever 46 and the top connection 50 to transmit brake power to the wheels of the truck in like manner to that concurrently applied to the wheels of the other truck. In practice the various levers and connections are proportioned so that on application of air to the brake cylinder 19, substantially equal braking power is concurrently applied to both trucks at opposite ends of the car.

The present invention comprehends the provision of a simplified and improved brake apparatus which, on operation of a hand brake, such as the ordinary brake staff, will, under normal or even subnormal conditions apply a braking power to the wheels of the trucks not less than that of the air braking equipment in the manner aforesaid, and which will operate in harmony with the air braking equipment, that is to say, independently of the air braking equipment, so that application of braking power by the air cylinder 19 will not affect the directly operated manual parts of the hand-operated section of the brake apparatus.

A floating power augmenting lever 52 is supported by the car under frame. One end of this lever 52 is pivotally connected at 53 with the top connection 26 and by a yielding connection such as the chain 54, which forms a part of said top connection 26, with the point of pivotal connection between the cylinder lever 23 and the top connection 26. Between its ends at the point 55, the floating lever 52 is connected by a link 56 with the fulcrumed lever 46. The points of connection of said link 56 with both said levers 52 and 46 are so positioned as to provide long arms of said levers 52 and 46 that are both located on the same side of the link 56, with the result that the floating lever 52, functions as a power augmenting lever, and the lever 46 by reason of the reversal of its fulcrum point, as hereinabove mentioned, functions as a power reducing lever for transmitting power to the top connection 50. The end of the lever 52 opposite to its connection point 53 is pivotally connected at 61 to a yielding member, such as the chain 62, and the latter is connected at 63 with the inner end of the hand brake rod 64.

The extreme forward end of said hand brake rod 64 is provided with a link 65 which forms one link of an endless chain member 66, the inner end of which passes around the sheave 67 that is supported by a bracket 68 secured to the car under-frame. The outer end of this endless chain 66 has an operative connection with the brake staff, and the connection so provided for transmitting power applied to the brake staff through the rod 64 constitutes an important feature of the invention. The brake staff 69 is supported at its lower end by a bracket 70 secured to the car under-frame and carries a sheave 73 having a spindle 74 at its lower end which enters a bearing 75 provided in the bottom of the bracket 70. The outer end of the aforesaid chain 66 engages the sheave 73 and the sheave is especially constructed to provide a positive non-slipping engagement of the chain 66, with the result that the brake staff may be operated to apply its braking power efficiently, without damage of jamming, until the brakes are firmly clamped against the wheels.

As shown, particularly in Figs. 8 and 9, the chain 66 is constituted of links 76 which travel in a horizontal plane and of alternately arranged links 77 which travel in a vertical plane. The sheave 73 is provided with a horizontal annular groove 78 to receive the horizontal links of the chain 66, and also with a plurality of, in the present instance 4, recesses or sockets 79, the inner walls of which are arranged perpendicularly to and intersect the annular groove 78. As shown in Figs. 7 and 8, abutments 80 are formed at the opposite ends of each socket 79, and, in passing around with the sheave 73 the vertical links 77 of the chain respectively enters the sockets 79 between the abutments 80 and are thus held against slipping while, at the same time, the horizontal links pass into the horizontal groove 78. With this construction, a positive connection is provided between the sheaves 73 and the chain 66 so that all of the power developed on the hand wheel of the sheave is transmitted through the chain 66 to the hand brake rod 64.

With the above described connections from the hand brake to the brake beams and shoes, on application of a normal braking power to the hand brake wheel on the brake staff 69 a greatly augmented braking power is transmitted through the levers 52 and 46 to the top connections 26 and 50, this braking power being not less than that transmitted to these connections on application of the air brake. The normal braking power of an air brake for freight cars is approximately 60% of the light weight of the car. By means of a power augmenting mechanism constructed in acordance with the present invention, the braking power of the wheels may be readily augmented to and beyond 100% of the light weight of the car. The application of a normal braking power to the opposite sides of the hand brake wheel, for example an application of forty-five pounds braking power to the opposite sides of the hand brake wheel, will ultimately result in a braking power on the brake shoes of substantially 100% of the light weight of the car. Consequently a braking power equal to 60% of the light weight of the car can easily be obtained by the application of even less than the normal braking power to the opposite sides of the hand brake wheel. Moreover the improved hand brake construction in accordance with the invention operates in entire harmony with the air brake equipment, that is to say, the arrangement prevents the transmission of power from the air brake cylinder to the hand brake wheel, consequently there is no danger of injury to a trainman who might be in the act of applying the hand brake at the same instant that the engineer has applied the air brakes.

The invention as hereinabove set forth is embodied in a particular form of construction but may be variously embodied within the scope of the claims hereinafter named.

I claim:

1. In a railway brake apparatus, in combination: truck levers at opposite ends of the car, a hand-operated brake element, and power connections interposed between said hand operated brake element and said truck levers, said power connections including a single power augmenting lever and a power transmitting lever and a single link connecting said levers, and an endless chain interposed between said power augmenting lever and said hand operated brake element, whereby power may be directly transmitted from said hand operated brake element to said power augmenting lever when the brake is applied.

2. In a railway brake apparatus, in combination with the air brake mechanism which includes the brake cylinder, the brake shoe levers and the lever and rod connections from the brake cylinder to said brake shoe levers: a hand-operated brake element, power connections interposed between said hand operated brake element and said brake shoe levers, said power connections including a single floating power augmenting lever and a power transmitting lever operatively connected thereto, and an endless chain interposed between said power augmenting lever and said hand operated brake element, whereby power may be directly transmitted from said hand operated brake element to said power augmenting lever independently of power applied from said brake cylinder.

3. In a railway brake apparatus, in combination with the air brake mechanism including the brake cylinder, the brake shoe levers, and the lever and rod connections from the brake cylinder to said brake shoe levers; a brake staff, a sheave carried thereby and having a plurality of grooves and recesses therein, power connections interposed between said brake staff and said brake shoe levers, said power connections including a single power augmenting lever and a power transmitting lever and a single link connecting said levers, and an endless chain connected to said power augmenting lever and passing over said sheave, the links of said chain being adapted to successively enter the grooves and recesses in said sheave to effect a driving connection therewith, whereby power may be instantly transmitted from said brake staff to said power augmenting lever and said brake shoe levers independently of said brake cylinder.

4. In a railway brake apparatus, comprising in combination: an air brake system, a hand operated brake element, power connections interposed between said hand operated brake element and the brake shoe levers operated by said air brake system, said power connections including a floating power augmenting lever, and an endless chain interposed between said power augmenting lever and said hand operated brake element, a sheave carried by said hand operated brake element and having grooves and recesses cooperating with the links of said endless chain to effect a driving engagement, and a flexible connection interposed between said power augmenting lever and said air brake mechanism, whereby power may be directly transmitted from said hand operated brake element to said brake shoe levers independently of said air brake system.

In testimony whereof I have hereunto set my hand.

HARLEY E. ANDERSON.